United States Patent
Aneja et al.

[11] Patent Number: 6,037,055
[45] Date of Patent: Mar. 14, 2000

[54] LOW PILL COPOLYESTER

[75] Inventors: Arun Pal Aneja; Frederick Karl Mallon; Adrian Charles Snyder, all of Greenville, N.C.

[73] Assignee: E. I. du Pont de Nemours and Company, Wilmington, Del.

[21] Appl. No.: 09/149,582

[22] Filed: Sep. 8, 1998

Related U.S. Application Data

[63] Continuation-in-part of application No. 08/992,045, Dec. 17, 1997, Pat. No. 5,817,740, which is a continuation-in-part of application No. 08/799,514, Feb. 12, 1997, abandoned.

[51] Int. Cl.$^7$ .............................. D02G 3/00; C08G 63/78
[52] U.S. Cl. .......................... 428/364; 528/275; 528/293; 528/302; 528/308; 528/308.6; 524/155; 524/161; 524/261; 524/730; 524/745; 428/365
[58] Field of Search ................................... 528/275, 293, 528/302, 308, 308.6; 524/155, 161, 261, 730, 745; 428/364, 365

[56] References Cited

U.S. PATENT DOCUMENTS

| | | | |
|---|---|---|---|
| H1275 | 1/1994 | Duncan | 428/357 |
| 2,071,251 | 2/1937 | Carothers | 18/54 |
| 2,465,319 | 3/1949 | Whinfield et al. | 260/75 |
| 3,018,272 | 1/1962 | Griffing et al. | 260/75 |
| 3,104,450 | 9/1963 | Christens et al. | 57/140 |
| 3,335,211 | 8/1967 | Mead et al. | 264/176 |
| 3,576,773 | 4/1971 | Vaginay | 260/22 |
| 3,914,488 | 10/1975 | Gorrafa | 428/397 |
| 4,110,316 | 8/1978 | Edging et al. | 526/68 |
| 4,113,704 | 9/1978 | MacLean et al. | 528/289 |
| 4,146,729 | 3/1979 | Goodley et al. | 560/94 |
| 4,634,625 | 1/1987 | Franklin | 428/258 |
| 4,707,407 | 11/1987 | Clark et al. | 428/361 |
| 4,945,151 | 7/1990 | Goodley et al. | 528/272 |
| 5,219,582 | 6/1993 | Anderson et al. | 425/72.2 |
| 5,300,626 | 4/1994 | Jehl et al. | 528/274 |
| 5,478,909 | 12/1995 | Jehl et al. | 528/274 |
| 5,559,205 | 9/1996 | Hansen et al. | 528/279 |
| 5,591,523 | 1/1997 | Aneja | 428/357 |
| 5,607,765 | 3/1997 | Hansen et al. | 428/364 |
| 5,626,961 | 5/1997 | Aneja | 428/397 |
| 5,736,243 | 4/1998 | Aneja | 428/357 |
| 5,834,119 | 11/1998 | Roop | 428/397 |

FOREIGN PATENT DOCUMENTS

WO 92/13120  8/1992  WIPO .

OTHER PUBLICATIONS

Ludewig, "Polyester Fibres, Chemistry & Technology", 1971, p. 105 and pp. (iii) and (iv).
ASTM D3512–82.

*Primary Examiner*—Samuel A. Acquah

[57] ABSTRACT

New copolyester composition that provides excellent filament spinning and mill/yarn processing of staple fiber into fabrics having combination of excellent pilling performance as well as aesthetics and tactility ("hand"). Preferred fibers have non-round cross-sections, especially multi-grooved and scalloped-oval cross-sections that provide fabrics having outstanding comfort qualities of moisture-management, dryness and comfort, as well as minimal pilling.

8 Claims, 3 Drawing Sheets

LOW PILL COPOLYESTER

CROSS-REFERENCE TO RELATED APPLICATION

This application is a continuation-in-part of application Ser. No. 08/992,045, filed by Anderson et al on Dec. 17, 1997, and to issue as U.S. Pat. No. 5,817,740, being itself a continuation-in-part of application Ser. No. 08/799,514, filed Feb. 12, 1997, and now abandoned.

FIELD OF THE INVENTION

This invention concerns improvements in low pill copolyester, as described hereinafter, and is more particularly concerned with a new copolyester composition that provides staple fiber that is capable of forming yarns, fabrics and garments that have a combination of excellent pilling performance, particularly in the presence of humidity/moisture, aesthetics and tactility ("hand"), especially such staple fiber of non-round cross-sections as multi-grooved scalloped-oval cross-sections that retain such cross-section so their fabrics have outstanding qualities of moisture-management, dryness and comfort as well as exhibiting minimal pills (particularly in the presence of moisture), and downstream products thereof, intermediates therefor and processes for obtaining or processing any of these.

BACKGROUND OF INVENTION

This invention is an improvement in, and, largely, a selection from the range of low pill copolyester described and claimed by Anderson et al. in U.S. Pat. No. 5,817,740 (DP-6585-A) and corresponding WO 98/36027, which are expressly incorporated herein by reference. The extensive background in polyester staple fibers and previous efforts to improve their pilling performance has been described therein, including the following prior publications, U.S. Pat. Nos. 2,071,251 (Carothers) 2,465,319 (Whinfield and Dickson), 4,110,316 (Edging and Lee), 4,113,704 (MacLean and Estes), 4,146,729 (Goodley and Shiffler), 4,945,151 (Goodley and Taylor), 3,104,450 (Christens et al), 3,335,211 (Mead et al), 3,018,272 (Griffing and Remington), 5,559,205 and 5,607,765 (Hansen et al.), 3,576,773 (Vaginay), and 5,300,626 and 5,478,909 (Jehl et al.), Ludewig in "Polyester Fibres, Chemistry and Technology", published in German in 1964 and in English in 1971 by John Wiley and Sons, Ltd., Oxford et al in WO 92/13120, and Duncan in U.S. SIR H1275. Also specific non-round cross-sections referred to herein as multi-grooved cross-sections have been disclosed in U.S. Pat. Nos. 5,591,523, 5,626,961 and 5,736,243 (Aneja) and in U.S. application Ser. No. 08/778,462 (DP-6550, Roop), now allowed, and earlier cross-sections, referred to as scalloped-oval, in 3,914,488 (Gorrafa), 4,634,625 (Franklin) and 4,707,407 (Clark et al.). These prior publications are expressly incorporated herein by reference and are discussed in much more detail in U.S. Pat. No. 5,817,740 and WO 98/36027, referred to hereinabove.

Aforesaid U.S. Pat. No. 5,817,740 describes and claims a basic-dyeable, ethylene terephthalate copolyester polymer that contains 0.5 to 3 mol % of a sodium sulfonate salt of a glycollate of isophthalic acid, and that has been polymerized in the presence of a trifunctional or tetrafunctional silicate ortho ester in amount 0.05 to 0.5% by weight, and that contains titanium dioxide in amount 0.1 to 2% by weight, said copolyester being of relative viscosity about 8 to 12 LRV and about 1 to 3 delta RV, as defined, especially in the form of staple fiber that provides fabrics of acceptable hand and of improved pill rating as compared with fabrics of commercially-available fibers of scalloped-oval cross-section known as Type 702W, as described therein (as Comparison B therein), and compared also hereinafter. The relative viscosities (LRV, delta RV and NRV) and how they are measured are described in the aforesaid U.S. patent, and an understanding of them is important for understanding the present invention, as will be apparent hereinafter. The silicate ester acts as a chain-branching agent during polymerization but may be hydrolyzed downstream, i.e., later.

As in the aforesaid patent, terms such as "filament" and "fiber" are often used generically.

The objective of the present invention is to provide copolyester polymer and fiber of still further improved pill rating and/or other advantages as compared with what was specifically disclosed in aforesaid U.S. Pat. No. 5,817,740 and WO 98/36027.

We had noted that pilling in 100% polyester garments had been much worse in specific areas of garments, such as the neck, collar, armpits, and upper thigh (groin), and also after undergoing laundering. But we had not understood the effect of moisture on measurements of pilling, for instance when making RTPT pill ratings following ASTM D-3512-82. This will be discussed hereinafter. Another matter that we had not sufficiently understood was the hydrolysis of the polymer in fiber form, especially during downstream processing, or its effect upon NRV.

SUMMARY OF THE INVENTION

Figure 1:
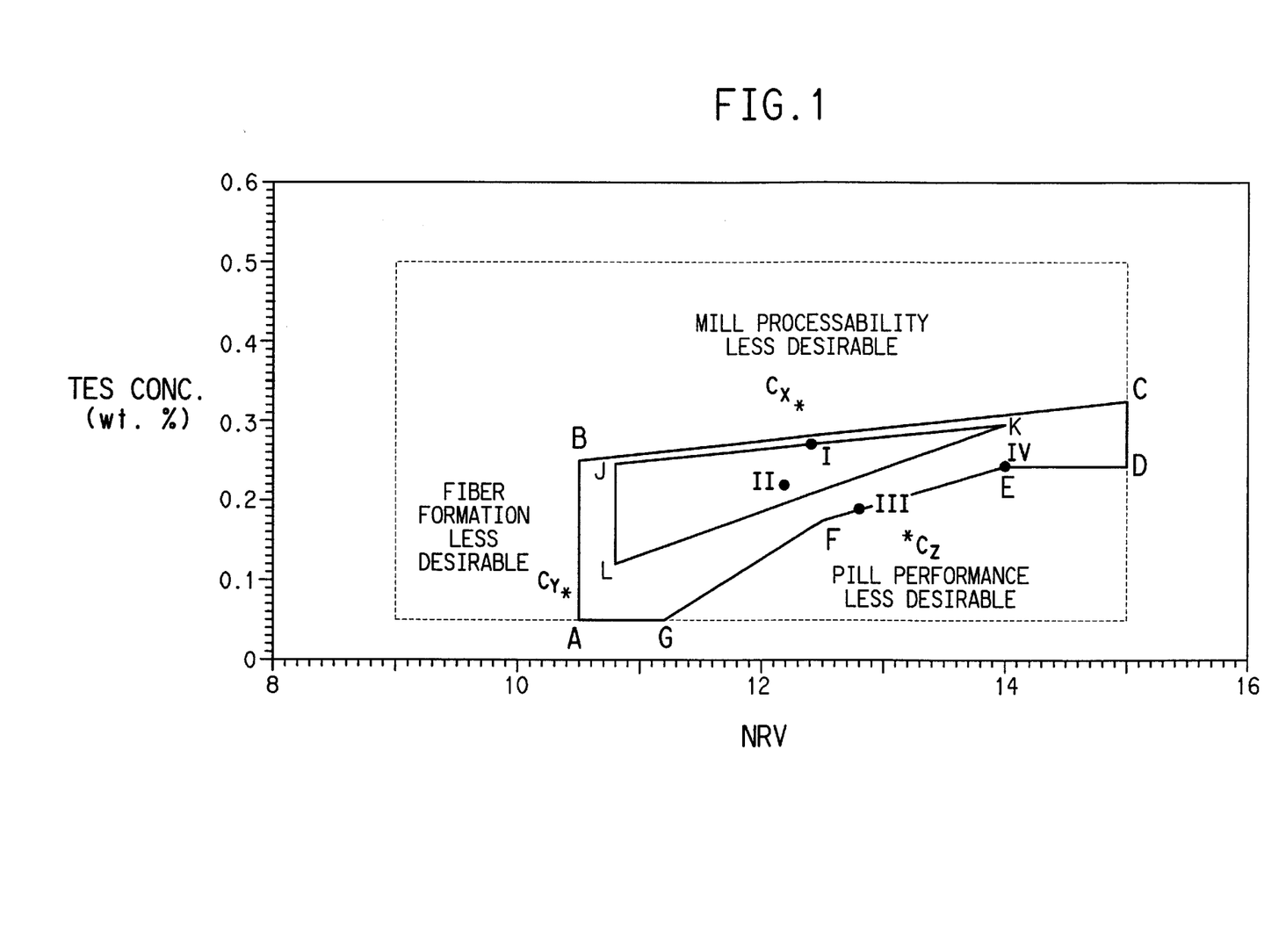
FIG. 1 is a plot of NRV vs. amount (TES %) as described herein in more detail.

According to one aspect of the invention, there is provided a basic-dyeable ethylene terephthalate copolyester polymer that contains 0.5 to 3 mol % of a sodium sulfonate salt of a glycollate of isophthalic acid, and that has been polymerized in the presence of a trifunctional or tetrafunctional silicate ortho ester in amount (TES %) at least 0.05% by weight, said copolyester being of LRV relative viscosity about 8 to about 12 and about 1 to 3 delta RV, as defined, wherein said amount (TES %) corresponds to the Non-Acid Relative Viscosity (NRV) of the polymer as defined by the polygon ABCDEFGA in FIG. 1 of the accompanying Drawings.

Preferably said amount (TES %) corresponds to the (NRV) as defined by the triangle JKLJ in FIG. 1 of the accompanying Drawings.

An important aspect of the invention is the provision of such polymer in the form of fibers. We have found that such new selected copolyester polymer compositions can be spun and drawn and converted into staple fiber that can provide knit fabrics of 100% polyester that have an excellent pill rating, even when tested in presence of moisture. We have also found that such fabrics can be made to have a hand that is acceptable for previously unattainable end-uses, hand being rather subjective.

According to another aspect of the invention, therefore, there is provided basic-dyeable ethylene terephthalate copolyester staple fiber of denier per filament about 0.5 to about 5 (about 0.6 to about 6 dtex) and cut length about 20 mm to about 10 cm, such as is capable of providing knitted fabrics of 100% polyester fiber of RTPT pill rating as defined herein of at least 2.5, preferably at least 3, after a period of 30 minutes and sometimes more. Such pill ratings as defined herein have not previously been obtained by a practicable process for knitted fabrics of 100% polyester fiber. As indicated, we have made such fabrics with a good hand.

We have found, according to the invention, that some of such new selected copolyester polymers can be formed into staple fiber of non-round cross-section, especially multi-grooved and scalloped-oval cross-sections that have excellent cross-sectional shape retention, for instance an excellent multi-grooved configuration that can provide excellent comfort properties, such as moisture-management and dryness in fabrics, as well as excellent pilling performance and tactile aesthetics.

According to another aspect of the invention, therefore, there is provided basic-dyeable ethylene terephthalate copolyester staple fiber of multi-grooved peripheral cross-section of aspect ratio about 1.3:1 to about 3:1 and groove ratio as defined about 0.50:1 to about 0.95:1. Groove ratio is described by Aneja in U.S. Pat. No. 5,626,961 (DP-6365-A) and by Roop in application Ser. No. 08/778,462 (DP-6550) filed Jan. 3, 1997, and now allowed, and is hereby defined as the ratio of the separation distance (such as $d_1$) between grooves on either side of the major axis of the cross-section to the width (such as $b_1$) of a bulge measured across the major axis as described therein.

As indicated, the silicate ester chain-brancher in the polymer can be hydrolyzed. This tends to happen over time when the polymer in the form of fiber is exposed to moisture, for instance in the atmosphere, and especially during aqueous treatments at elevated temperatures, such as dyeing of fabrics and garments. As the chain-brancher links are hydrolyzed, the NRV tends to decrease significantly more than the LRV. Consequently, the NRV of polymer and fiber that have been spun having viscosities according to the invention as described already and that can be processed to have highly desirable performance properties as have already been described may well decrease below the ranges already described (with reference to polygon ABCDEFGA and triangle JKLJ) although, when spun, that polymer provided the basis for making fibers, fabrics and garments of such highly desirable performance properties because that polymer, as-spun, was within the ranges described (with reference to polygon ABCDEFGA, and preferably triangle JKLJ). So another aspect of the invention is fiber having a (TES wt %) amount that may not always correspond to the NRV, as described for the amounts (TES %) in relation to such polygon or triangle.

Figure 2:
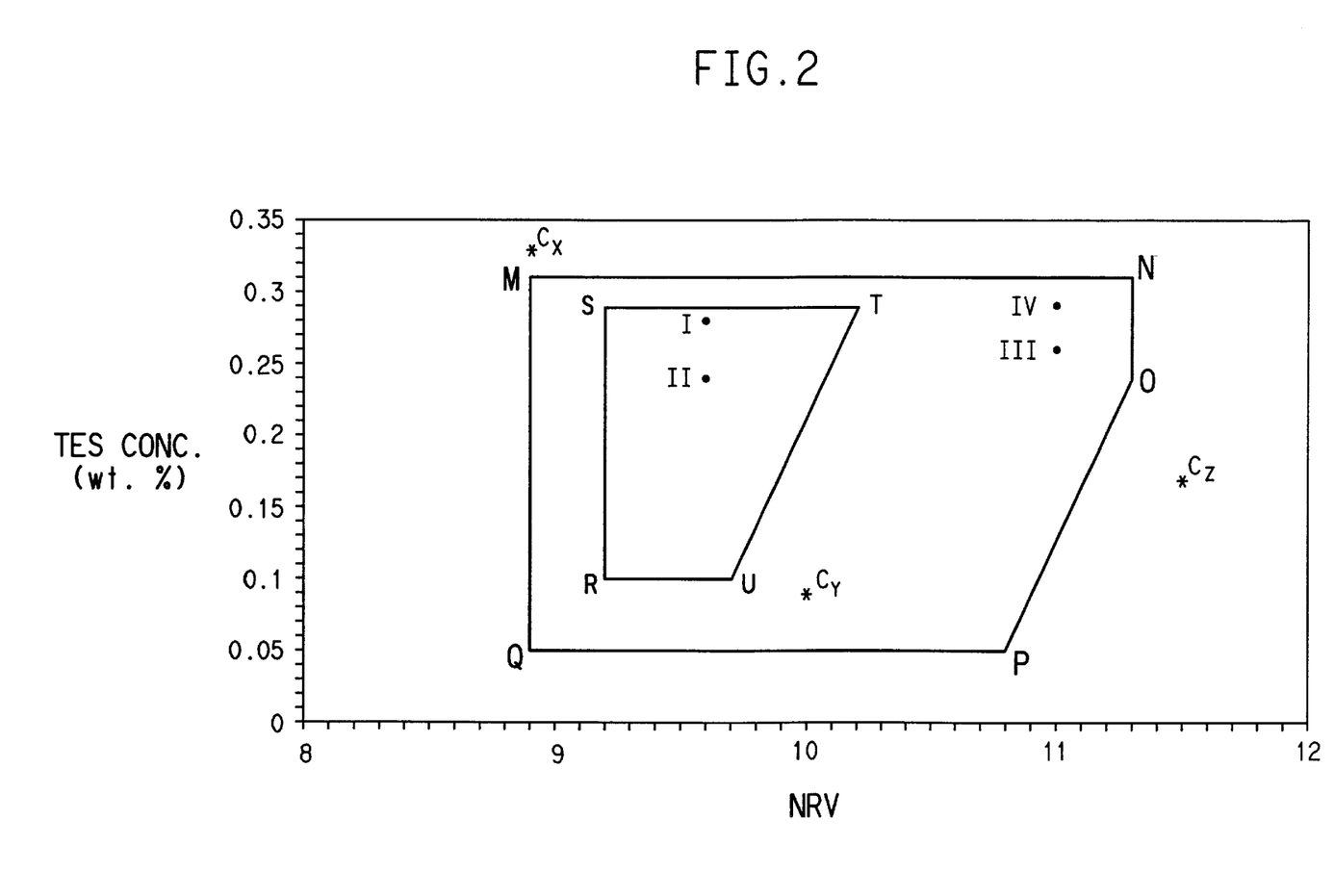
FIG. 2 is a plot of NRV vs. (TES wt %) amount as described herein in more detail.

According to another aspect of the invention, therefore, there is provided a basic-dyeable ethylene terephthalate copolyester polymer that is in the form of fiber and that contains 0.5 to 3 mol % of a sodium sulfonate salt of a glycollate of isophthalic acid, and that has been polymerized in the presence of a trifunctional or tetrafunctional silicate ortho ester in amount (TES %) at least 0.05% by weight, said fiber being of LRV relative viscosity about 8 to about 12, as defined, and having a (TES wt %) amount that corresponds to the Non-Acid Relative Viscosity (NRV) of the fiber as defined by the pentagon MNOPQM in FIG. 2 of the accompanying Drawings.

Preferably said (TES %) amount corresponds to the NRV as defined by the quadrilateral RSTUR in FIG. 2 of the accompanying Drawings.

We use herein the expression "(TES wt %) amount" to indicate such amounts in fiber that are relevant to the pentagon and quadrilateral in FIG. 2 in contrast to the expression "amount (TES %)" (which is also by weight) that is relevant to the polygon and triangle in FIG. 1.

Preferably, also provided are staple fiber of denier, cut length, and providing RTPT pill ratings as hereinabove and also preferably of cross-section as hereinabove.

Also provided, according to the invention, are downstream products of such fibers, including yarns, fabrics and garments and intermediate products, such as continuous filaments, tows and slivers, (including blends with other fibers, especially with cotton or wool, being natural fibers), and processes for obtaining and for processing any of them. Preferred such processes are as follows, it being understood that the term "monomer" is used for convenience, as oligomer may be formed in a vessel before entering a polymerization vessel.

Accordingly, there is provided a continuous process for preparing such new basic-dyeable ethylene terephthalate copolyester polymer comprising (1) forming a monomer by a transesterification reaction between ethylene glycol and dimethyl terephthalate in a mole ratio of about 1.5–2.5:1 while introducing into the reaction a trifunctional or tetrafunctional silicate ortho ester and the sodium salt of dimethyl5-sulfoisophthalate mixed in with at least some of said ethylene glycol, preferably at a temperature of about 100–150° C., (2) passing the resulting monomer, preferably at a temperature of about 200–240° C., via transfer piping while introducing therein a slurry of finely divided titanium dioxide in some of said ethylene glycol to a polymerization vessel, and (3) effecting polymerization of said monomer in a series of polymerization vessels while reducing the pressure to remove byproduct ethylene glycol and increasing the temperature, and preferably sequentially reducing the pressure to about 1 to 7 mm Hg.

There is also provided a continuous process for preparing such new basic-dyeable ethylene terephthalate copolyester polymer comprising (1) forming a monomer by a transesterification reaction between ethylene glycol and dimethyl terephthalate in a mole ratio of about 1.5–2.5:1 while continuously introducing into the reaction the sodium salt of dimethyl 5-sulfoisophthalate mixed in with said ethylene glycol, preferably at a temperature of about 100–150° C., (2) passing the resulting monomer, preferably at a temperature of about 200–240° C., via transfer piping while introducing therein a slurry of finely divided titanium dioxide in additional ethylene glycol and the ethylene glycollate form of the silicate ortho ester mixed in with additional ethylene glycol to a polymerization vessel, and (3) effecting polymerization of said monomer in a series of polymerization vessels while reducing the pressure to remove byproduct ethylene glycol and increasing the temperature, and preferably sequentially reducing the pressure to about 1 to 7 mm Hg.

There is further provided a continuous process for preparing such new basic-dyeable ethylene terephthalate copolyester polymer comprising (1) forming a monomer by an esterification reaction between ethylene glycol and terephthalic acid in a mole ratio of about 1.5–2.5:1, (2) passing the resulting monomer, preferably at a temperature of about 200–240° C., while introducing therein ethylene glycollates of the sodium salt of 5-sulfoisophthalic acid and of a trifunctional or tetrafunctional silicate ortho ester in additional ethylene glycol and a slurry of finely divided titanium dioxide in additional ethylene glycol to a polymerization vessel, and (3) effecting polymerization of said monomer in a series of polymerization vessels while reducing the pressure to remove byproduct ethylene glycol and increasing the temperature, and preferably sequentially reducing the pressure to about 1 to 7 mm Hg.

Preferably such new copolyester polymer is melt-spun into filaments at a withdrawal speed of about 1200 to 1800 ypm (1100–1650 m/min), and drawn preferably about 2×–3.5×, preferably at a temperature of about 80–100° C., crimped and then relaxed, preferably at a temperature of about 100–175° C., and, if desired being annealed at a temperature of about 150–230° C. before being crimped and relaxed. The resulting filaments (including staple fiber) are preferably of 0.5 to 5 dpf (about 0.5 to 6 dtex).

DETAILED DESCRIPTION OF THE EMBODIMENTS

As indicated in the Background, the art contains much description relevant to the manufacture of polyester polymer compositions, their melt-spinning (extrusion) into filaments, processing of the filaments, including conversion to staple fiber, processing of staple fiber into spun yarn, processing of spun yarn into fabrics, and the treatment of fabrics, such as dyeing and finishing, and the testing of such fabrics and garments for their performance and of precursor filaments and staple, so it would be redundant to repeat such disclosure that is already available in the art; the disclosures in the art referred to herein, and in art cited therein are incorporated herein specifically by reference.

Useful staple fiber for conversion into spun yarn and for use in fabrics thereof is generally of dpf about 0.5 to 5 (0.5 to 6 dtex) and of cut length about 20 mm to about 10 cm. The new copolyester may, however, be used for other applications, which may require different shaped articles and/or other parameters.

A copolyester having ethylene terephthalate repeat units and containing also a sodium sulfonate salt of a glycollate of isophthalic acid has been used to improve dyeability for many years, as indicated in references such as we have mentioned hereinabove. Suitable amounts of such metal salt comonomer are generally 0.5 to 3 mol %, as disclosed in the art. The improved dyeability of the new polyesters according to the present invention is an important advantage, and overcomes one of the "complaints" about homopolyester PET fiber, but is not by itself a novel feature. Much of the disclosure hereinafter is directed to an ethylene terephthalate copolyester composition that has been found especially useful and advantageous, namely the sodium salt of dimethyl 5-sulfoisophthalate modified with tetraethyl orthosilicate, as these comonomers have been available and have given such excellent and surprising results according to the invention. However, variations may be used, as disclosed in the art.

Likewise, the use of oxysilicon compounds, such as tetraethyl orthosilicate, to improve pilling performance of polyester fibers was suggested generally and specifically in the prior art, such as mentioned hereinbefore, so is not by itself a novel feature.

No combination, however, of all claimed features of the present invention has been specifically taught, and, importantly, pilling has remained a serious problem for the polyester fiber industry despite the many suggestions published in the art.

As indicated already, the viscosities (LRV, NRV and delta RV) are fully defined in the aforesaid U.S. Pat. No. 5,817,740 and WO 98/36027, and as will be understood, depending on the processing of the fibers and fabrics containing the polymers, hydrolysis is likely to take place so the NRV will decrease as a result and the delta RV may disappear, but traces of the silicate will remain and we have found that pilling performance of fabrics made from fibers spun from filaments having viscosities as claimed has been excellent and these attributes will reveal use of the present invention upstream.

The invention for the polymer that is made and spun into fibers may be represented by a basic-dyeable ethylene terephthalate copolyester polymer that (1) contains a sodium sulfonate salt of a glycollate of isophthalic acid, (2) generally contains a delusterant, preferably titanium dioxide, as described in aforesaid U.S. Pat. No. 5,817,740 and WO 98/36027, and (3) that has been polymerized to an NRV range in the presence of a trifunctional or tetrafunctional silicate orthoester, in amount by weight, i.e., "Amount (TES %)" as defined essentially within the polygon ABCDEFGA in FIG. 1 of the accompanying Drawings, and preferably as defined essentially within the triangle JKLJ therein.

The points plotted on FIG. 1 of the accompanying Drawings have the following coordinates for NRV and for amount (TES %):

| POINT | NRV  | Amount (TES %) |
|-------|------|----------------|
| A     | 10.5 | 0.05           |
| B     | 10.5 | 0.258          |
| C     | 15.0 | 0.325          |
| D     | 15.0 | 0.240          |
| E     | 14.0 | 0.240          |
| F     | 12.5 | 0.176          |
| G     | 11.2 | 0.05           |
| J     | 10.8 | 0.247          |
| K     | 14.1 | 0.295          |
| L     | 10.8 | 0.116          |

The equations for the lines that join adjacent points and define the polygon and the triangle are as follows:

| LINE | EQUATION |
|------|----------|
| AB   | NRV = 10.5 |
| BC   | (TES %) = 0.100 + 0.015 NRV |
| CD   | NRV = 15.0 |
| DE   | (TES %) = 0.240 |
| EF   | (TES %) = −0.362 + 0.043 NRV |
| FG   | (TES %) = −1.025 + 0.096 NRV |
| GA   | (TES %) = 0.05 |
| LJ   | NRV = 10.8 |
| JK   | (TES %) = 0.085 + 0.015 NRV |
| KL   | (TES %) = −0.467 + 0.054 NRV |

Figure 3:
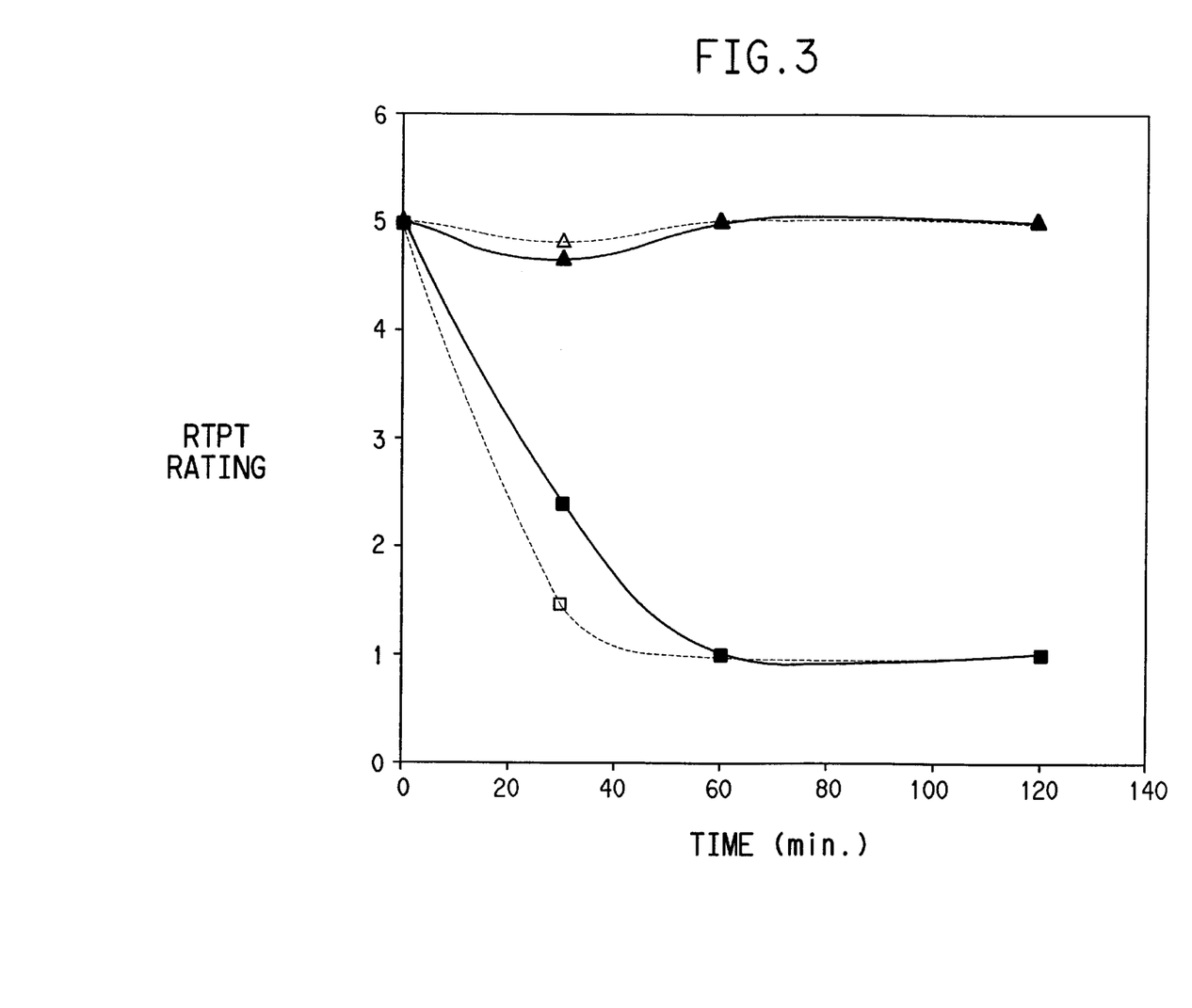
FIG. 3 gives plots of RTPT pill ratings measured after time intervals as described hereinafter in more detail.

The lines DE, EF and FG are mathematical approximations to represent a curve, and the line KL could also have been represented instead by a curve but, for simplicity is shown linearly between K and L, it being understandable that no precise boundaries are being defined, but that problems tend to increase as shown in FIG. 1 as the amount (TES %) in relationship to the NRV is further removed from within the preferred zone that is shown. Thus, as the NRV (of the polymer spun) drops, fiber formation problems tend to increase. As the amount (TES %) is increased, mill processability problems tend to increase. As the amount (TES %) is decreased and as the viscosity is increased, pilling problems tend to increase. But it is possible, as shown in Example 1 and FIG. 1, to use an amount (TES %) and a polymer NRV so as to spin filaments and process them in the mill to produce 100% polyester knitted fabrics whose pill performance is excellent and unprecedented as shown in FIG. 3.

The invention for the polymer that has been spun into fibers and that may have been hydrolyzed to a significant extent so as to lower the NRV may be represented by a basic-dyeable ethylene terephthalate copolyester polymer that (1) contains a sodium sulfonate salt of a glycollate of isophthalic acid, (2) generally contains a delusterant, preferably titanium dioxide, as described in aforesaid U.S. Pat. No. 5,817,740 and WO 98/36027, and that has been polymerized in the presence of a trifunctional or tetrafunctional silicate orthoester, and wherein the NRV and (TES wt %) amount are as defined essentially within the pentagon MNOPQM in FIG. 2 of the accompanying Drawings, and preferably as defined essentially within the quadrilateral RSTUR therein.

The points plotted on FIG. 2 of the accompanying Drawings have the following coordinates for NRV and for (TES wt %) amount, and the lines that join adjacent points have equations given as follows:

| POINT | NRV | (TES WT %) AMOUNT |
| --- | --- | --- |
| M | 8.9 | 0.31 |
| N | 11.3 | 0.31 |
| O | 11.3 | 0.24 |
| P | 10.8 | 0.05 |
| Q | 8.9 | 0.05 |
| R | 9.2 | 0.10 |
| S | 9.2 | 0.29 |
| T | 10.2 | 0.29 |
| U | 9.7 | 0.10 |

| LINE | EQUATION |
| --- | --- |
| QM | NRV = 8.9 |
| MN | (TES wt %) = 0.31 |
| NO | NRV = 11.3 |
| OP | (TES wt %) = 0.40 NRV −4.28 |
| PQ | (TES wt %) = 0.05 |
| RS | NRV = 9.2 |
| ST | (TES wt %) = 0.29 |
| TU | (TES wt %) = 0.38 NRV −3.57 |
| UR | (TES wt %) = 0.10 |

FIG. 3 provides plots of RTPT pill ratings measured as described hereinafter (both without and with added moisture) over a period of time for fabrics made from fiber and polymer described in Example 1 of the invention herein and, for comparison, from Type 702W fiber which has a somewhat similar cross-section. The improvement obtainable by the invention in this regard is very striking. The RTPT Pill Ratings measured as described hereinafter are shown in FIG. 3 as follows:

1. Solid shapes indicate measurements without added moisture, whereas open shapes indicate measurements in the presence of added moisture as described;

2. Triangles were ratings made on knitted fabrics as described hereinafter in Example I according to the invention;

3. Squares were ratings made on knitted fabrics as described hereinafter for Type 702W commercially-available fiber;

Despite the abundance of prior literature, no one previously has disclosed how to provide knit fabrics of 100% polyester staple fiber from an ethylene terephthalate polymer that could give a pill rating after 30 or 60 minutes as high as 4 or 5, using both RTPT pilling test procedures as described hereinafter, unlike what we have shown in FIG. 3.

The invention is further illustrated in the following Examples; all parts, percentages and proportions are by weight unless indicated otherwise, polymer weight recipes generally being calculated with regard to the weight of the polymer in the filaments. The yarn properties are measured in conventional units, denier being a metric unit, and so the tensile properties are given as measured in gpd, but conversions into SI units are also given in parentheses (g/dtex), and the Crimps per Inch, CPI, have similarly been converted, and are likewise shown in parentheses (CPcm).

The test procedures were as described in aforesaid U.S. Pat. No. 5,817,740, with some refinement however of the pilling test procedure, more rigorous testing conditions having proved desirable because of commercial needs as the presence of moisture has been found to affect the results. The testing (following ASTM D-3512-82) described in the aforesaid U.S. Patent used dehumidified air at a pressure of 3 psi (about 21 kPa). The ratings described herein were all carried out with air at 2.5 psi (about 17.5 kPa), which we have found to be more rigorous. In addition to ratings that were measured using dehumidified air as for the measurements in the aforesaid U.S. Patent, however, other measurements were made in the presence of moisture added by squirting water twice (applying a total of about 1.04 grams of water) into the tester every 30 minutes. As will be understood, therefore, the RTPT ratings are only truly comparable when all the fabrics are tested under the same conditions, so the RTPT ratings herein should not be compared with those in the U.S Patent, and the RTPT ratings herein are given both for testing without added water and in the presence of added moisture, as described above. The procedure for preliminary treatment of the knit fabrics was also changed from that described in aforesaid U.S. Pat. No. 5,817,740 and was as follows. The knit fabric is scoured by first being put into a 69 gallon (260 liter) Klauder, Weldon, Giles Model 25 PPW Beck Dye Machine with paddle agitator filled with tap water. It is then heated over a period of 5–10 minutes to 120° F. (49° C.) while being stirred. When that temperature is reached, the following reagents are added: Klenzol 201 at 2% OWF, Soda Ash at 2% OWF, Lana-Foam at 2% OWF, OWF being by weight calculated on the weight of fiber. The temperature is then raised to 220° F. (104° C.) at 15 psi (1 kg/cm$^2$) and held for 20 min. The solution is drained and the fabric is rinsed, dried in a home laundry type dryer (Kenmore) for 10 min at about 150° F. (65° C.) and pressed with a dry iron (heated to permanent press setting) to simulate calendering. The resulting "finished" fabrics are evaluated for aesthetics, "hand", and cover, as well as for pilling by the procedure that has just been described. The following pilling test procedure should, therefore, be used to measure a pill rating as defined herein. Staple fiber of cut length 1.5 inches (38 mm) is converted into yarn of 30/1 cc, which is knit on a 48-feed single jersey, 22-cut machine. The knit fabric is "finished" by the procedure that has just been described. The resulting "finished" fabric is evaluated for pilling following the procedure set out in the Random Tumble Pilling Tester Method ASTM D3512-82 and as described above, using dehumidified air at a pressure of 2.5 psi (about 17.5 kPa), in the presence of moisture added by squirting water twice (applying a total of about 1.04 grams of water) into the tester every 30 minutes. Such ratings are made on a scale of 1 to 5 by comparison with standard samples, 5 being the best, i.e., showing no pilling, whereas 1 is the worst, and the RTPT Pill Rating is an average of 10 tests, i.e., on 10 samples from the same fabric.

The amounts (TES %) given in the following Examples and herein were generally measured on filaments as spun (i.e., soon after spinning and before drawing). Viscosity measurements herein were also generally measured on as-spun filaments. As indicated, however in more detail hereinabove, and especially in Example II, the LRV remains relatively constant while the NRV tends to decrease and measurements have sometimes been made (where specifically indicated, as in Example II) on the fibers in fabrics that have been made and processed ("finished") essentially as has just been described.

EXAMPLE I

An ethylene terephthalate copolyester polymer was made with approx. 2 mol % of sodium dimethyl 5-sulfoisophthalate and 0.27 weight % of tetraethyl orthosilicate, amount (TES %), and containing 0.3 weight % of titanium dioxide and to have relative viscosities (after spinning) of 9.1 LRV and of 12.4 NRV, so 3.3 ΔRV, as follows. Ethylene glycol (EG), containing transesterification and condensation catalysts and, in approximate amounts by weight with respect to the weight of DMT added at this stage, 3.4 wt. % sodium dimethyl 5-sulfoisophthalate, 0.40 wt. % of tetraethyl orthosilicate, and 80 ppm of tetraisopropyl titanate, was preheated to 149° C. and metered into a transesterification reactor at a location above where dimethyl terephthalate (DMT) was also metered into the reactor at a temperature of approximately 175° C. The molar ratio of EG:DMT metered into the reactor was about 2.25:1. Temperature was controlled by a Dowtherm-heated calandria at about 236° C. at the base of the reactor. Low boiling materials (mainly methanol and water) were taken overhead in vapor form and condensed, and part was recycled (refluxed) to the top of the reactor. Monomer product was removed at the base of the calandria and was pumped via a monomer transferline to the first of three polymerization vessels. A slurry containing titanium dioxide and a recipe of whitening agents in additional EG was injected into the monomer transferline prior to entering the first vessel of these polymerization vessels. Phosphoric acid in additional EG was metered into this first polymerization vessel to deactivate the transesterification catalyst. The pressure in the first polymerization vessel was controlled at 100 mm Hg, and the temperature of the resulting prepolymer was controlled at 232° C. Prepolymer was transferred to the second polymerization vessel. Pressure in this second polymerization vessel was controlled at 35 mm Hg. Prepolymer of higher viscosity was removed from this vessel at a temperature of 261° C., and was transferred to the third polymerization vessel. Pressure in this third vessel was controlled to give the goal LRV and NRV (9.1 and 12.4, after spinning, respectively) and was usually in the range of 1.5 to 4 mm Hg. The temperature of polymer leaving this third vessel was controlled at approximately 269° C.

Filaments of approximately 3 dpf (3.3 dtex) were melt-spun at 272° C. from this copolyester by being extruded through a spinneret containing 1,506 capillaries at a rate of 92.4 lbs (41.9 Kg) per hour per position on 13 positions of a conventional spinning machine. The capillary orifice shape was three diamonds joined together as described by Aneja in U.S. Pat. No. 5,736,243 (DP-6400) so as to make filaments of 4-grooved scalloped-oval cross-section similar to that described therein. The filaments were spun at a withdrawal speed of 1500 ypm (about 1370 m/min), quenched as described by Anderson et al in U.S. Pat. No. 5,219,582, and collected in a can as a tow bundle of approximately 63,252 denier (about 70,280 dtex). The as-spun properties are given in Table I.

28 cans of this tow were combined to give a tow of 548,184 filaments and 1.65 million denier (1.83 million dtex), which was drawn at a draw ratio of 2.5× in hot spray water at a temperature of 85° C., then passed through a stuffer box crimper, and was then relaxed at a temperature of 123° C. to give a final tow of denier 778,421 (864,912 dtex), i.e., of filaments of about 1.42 dpf (1.6 dtex). The resulting (drawn) properties are also given in Table I.

The tows were cut to staple of length 1.5 inches (38 mm) after applying a conventional finish to give a level of about 0.22% finish on fiber, and the staple was converted to yarn (22/1 cc) and knit as described on a 48-feed single jersey, 22-cut machine to knit fabric that was "finished" so its pilling and other fabric characteristics could be evaluated as described. Fabrics had excellent pill performance (triangles in FIG. 3) both when tested without added moisture and when tested in the presence of added moisture which was not only surprising but an astonishingly high rating for a 100% polyester knit fabric, especially as the fabric also showed excellent aesthetics, hand (tactility), body and cover. Measurements on fiber from the "finished" fabric gave an NRV of 9.6 and a (TES wt %) amount of 0.28%.

TABLE I

| FILA-MENTS | TENA-CITY gpd (g/dtex) | $E_B$ % | MODU-LUS gpd (g/dtex) | DHS % | CPI (CPcm) | GROOVE RATIO | AS-PECT RATIO |
|---|---|---|---|---|---|---|---|
| As-spun | 0.84 (0.76) | 289 | 19 (17) | | | | |
| Drawn | 2.47 (2.25) | 19 | 38 (35) | 0.3 | 12 (5) | 0.91:1 | 1.6:1 |

EXAMPLE II

Copolyester was prepared and spun into filaments, collected, combined and drawn, essentially as described in Example I except that the amount (TES %) was about 0.22 weight % and the viscosities were 9.3 LRV and 12.2 NRV, so 2.9 ΔRV, as spun, and the final tows were of denier 789,384 (877,093 dtex), i.e., the filaments were of about 1.44 dpf (1.6 dtex). The properties are given in Table II.

TABLE II

| FILA-MENTS | TENA-CITY gpd (g/dtex) | $E_B$ % | MODU-LUS gpd (g/dtex) | DHS % | CPI (CPcm) | GROOVE RATIO | AS-PECT RATIO |
|---|---|---|---|---|---|---|---|
| As-spun | 1.0 (0.90) | 234 | 19 (17) | | | | |
| Drawn | 2.1 (1.9) | 17 | 40 (36) | 1.5 | 16 (6) | 0.78:1 | 1.6:1 |

The tows were cut to staple of length 1.5 inches (38 mm) after applying a conventional finish to give a level of about 0.26% finish on fiber, and the staple was converted to yarn (30/1 cc) and knit as described on a 48-feed single jersey, 22-cut machine to knit fabric that was "finished" so its pilling and other fabric characteristics could be evaluated as described. Fabrics had excellent pill resistance both when tested without added moisture and when tested in the presence of added moisture. To indicate how the NRV decreases more than the LRV, the filament viscosities after drawing were NRV=11.2, LRV=9.2, whereas viscosities in the "finished" fabric were NRV=9.6, LRV=8.6, and the (TES wt %) amount was 0.24%.

EXAMPLE III

Copolyester was prepared essentially as described in Example I except that the amount (TES %) was 0.19% by weight, and the viscosities were 9.9 LRV and 12.8 NRV, and so 2.9 ΔRV, and filaments of similar dpf and cross-section were spun, drawn and relaxed essentially as described in Example 1, and the properties of the spun and drawn filaments are in Table III. The tows of drawn filaments were processed essentially as described in Example 1, and the fabrics were also evaluated and had excellent aesthetics, as did those of Example 1, and their pilling performance was also far superior to that of prior Type 702W polyester fabrics, but slightly worse than that of Example 1. Measurements on fiber from "finished" fabric gave an NRV of 11.0 and a (TES wt %) amount of 0.26%.

TABLE III

| FILA-<br>MENTS | TENA-<br>CITY<br>gpd<br>(g/dtex) | $E_B$<br>% | MODU-<br>LUS<br>gpd<br>(g/dtex) | DHS<br>% | CPI<br>(CPcm) | GROOVE<br>RATIO | AS-<br>PECT<br>RATIO |
|---|---|---|---|---|---|---|---|
| As-spun | .96<br>(.87) | 211 | 18 (16) | | | | |
| Drawn | 2.1<br>(1.9) | 17 | 41 (37) | 0.9 | 13 (5) | 0.85:1 | 1.6:1 |

EXAMPLE IV

Copolyester was prepared essentially as described in Example 1 except that the amount (TES %) was 0.244% by weight, and the viscosities were 10.3 LRV and 14.0 NRV, and so 3.7 ΔRV, and filaments of similar dpf and cross-section were spun, drawn and relaxed essentially as described in Example 1, and the properties of the spun and drawn filaments are in Table IV. The tows of drawn filaments were processed essentially as described in Example 1, and the fabrics were also evaluated and had excellent aesthetics as did those of Example 1, and their pilling performance was also far superior to prior polyester fabrics, but inferior to that of Example I. Measurements on fiber from "finished" fabric gave an NRV of 11.0 and a (TES wt %) amount of 0.29%.

TABLE IV

| FILA-<br>MENTS | TENA-<br>CITY<br>gpd<br>(g/dtex) | $E_B$<br>% | MODU-<br>LUS<br>gpd<br>(g/dtex) | DHS<br>% | CPI<br>(CPcm) | GROOVE<br>RATIO | AS-<br>PECT<br>RATIO |
|---|---|---|---|---|---|---|---|
| As-spun | 1.0<br>(0.9) | 200 | 21 (19) | | | | |
| Drawn | 2.5<br>(2.2) | 17 | 38 (35) | 1.1 | 13 (5) | 0.80:1 | 1.6:1 |

Comparative Data

Comparative data are summarized in Table V hereinafter. In Table V, the performance experiences of Examples I and II (using polymer of NRV and amount (TES %) inside the preferred triangle JKLJ of FIG. 1 and providing fiber of (TES wt %) amount inside the preferred quadrilateral RSTUR of FIG. 2) are summarized together, and the performance experiences of Examples III and IV are summarized together (using polymer of NRV and amount (TES %) in the less preferred area of the invention shown outside triangle JKLJ but within polygon ABCDEFGA of FIG. 1 and providing fiber of (TES wt %) amount outside preferred quadrilateral RSTUR but within pentagon MNOPQM of FIG. 2), such performance experiences including filament spinning and mill/yarn process as well as RTPT Pill Ratings after 30 minutes of the resulting 100% polyester knit fabrics when tested without moisture and with added moisture as described previously. As can be seen from Table V, these performance experiences were surprisingly good for the Examples of the invention in all these performance respects in contrast to experience with prior art Type 702W and also when using polymer of different compositions of NRV and amount (TES %) outside polygon ABCDEFGA in FIG. 1. These different polymer compositions are referred to in Table V as Comparisons X, Y and Z, and also in Table VI, which gives properties of the filaments used in these Comparisons X, Y and Z, and for Type 702 W. Each of these Comparisons X, Y and Z were spun into filaments and then processed into fabrics essentially as described in Example I.

Comparison X

The filaments for Comparison X were spun from copolyester made essentially as described for Example I, but with a higher amount (TES %) of 0.322%, which is above Line BC of FIG. 1 herein, as the NRV was 12.3. These values for Comparison X are plotted on FIG. 1 as "$C_x$", which is outside polygon ABCDEFGA in FIG. 1, and estimated values are plotted on FIG. 2, and are estimated to be outside pentagon MNOPQM. The fibers obtained from Comparison X showed considerable amounts of "fly" waste (fiber and finish particles) during mill processing steps of carding, roving and spinning. Such "fly" waste is undesirable due to reduced productivity and especially inferior yarn quality (poor uniformity). The fabric had quite good pilling performance, however.

Comparison Y

The filaments for Comparison Y were spun from copolyester made essentially as described for Example 1 but of lower viscosity and amount (TES %), i.e., having 10.4 NRV (i.e., outside Figure ABCDEFGA, being below 10.5 NRV), and amount (TES %) of 0.086% (from approx. 0.16 wt. % of tetraethyl orthosilicate, with respect to the weight of the DMT, and the molar ratio of EG:DMT metered into the reactor was about 2.05:1). The values for Comparison Y are plotted on FIGS. 1 and 2 as "$C_y$", the NRV having decreased to 10.0 NRV, and the (TES wt %) amount being 0.09, measured on fiber in the "finished" fabric.

The fibers for Comparison Y are less desirable (although the fabric also had quite good pilling performance) because they could not be made efficiently owing to high levels of spinning breaks during melt spinning. In addition the fibers had very poor shape definition, as can be seen from the Groove Ratio in Table VI. As indicated, however, when filaments are made and processed into fabrics, the pilling performance is greatly improved over Type 702W.

Comparison Z

The filaments for Comparison Z were spun from copolyester made essentially as described for Example 1 but of relatively high viscosity, having 13.2 NRV, and relatively low amount (TES %) of 0.157 weight % (using, with respect to the weight of the DMT, approx. 0.22 wt. % of tetraethyl orthosilicate, and approximately 62 ppm of tetraisopropyl titanate (TPT), and a molar ratio of EG:DMT metered into the reactor of about 2.00:1). These values for Comparison Z are plotted on FIG. 1 as "$C_z$", and are below line EF. Estimated values are plotted for $C_z$ on FIG. 2 and are estimated to be outside pentagon MNOPQM.

The fibers for Comparison Z were spun efficiently and processed efficiently in the mill, but the resulting fabric showed inferior pill performance after 30 minutes, as can be seen from Table V.

Type 702W

In addition, fabrics were made and tested from commercially-available fibers, sold by DuPont as Type 702W. The copolyester was made with 2 mole % of sodium dimethyl 5-sulfoisophthalate and had an LRV of 13.8. No tetraethyl silicate was used. The filaments were spun essentially as described in Example 1, except as follows. The extrusion was through 1,054 capillaries at a rate of 64.7 lbs (29.4 Kg) per hour per position on 16 positions of a commercial spinning machine. The resulting tow was of 16,864 filaments and of 50,592 denier (56,200 dtex). 33 cans of such tow were combined to a total of 556,512 filaments, 1.7 million denier (1.9 million dtex). After drawing, the drawn filaments were relaxed at 123° C. to give a final denier of about 800,000 (900,000 dtex) and average dpf 1.4 (about 1.6 dtex, as for Example 1). The cut fibers were formed into yarns of 22/1 cc, and processed then essentially as described for Example I. The pill rating was only 1, the decreases in RTPT ratings when tested over a period of up to 2 hours being shown in FIG. 3, but the performance experience in spinning and in mill and yarn processing has been good and the fabric has good hand and cover, demonstrating the need for a fiber with comparable aesthetics and performance in spinning and mill yarn processing, but improved pilling performance.

The numerics in Table VI need little or no explanation beyond what is described in the art already referred to. A groove ratio of 1.0:1 would indicate the absence of any real groove in the sense that $d_1$ would be less than $b_1$, as described by Aneja in U.S. Pat. No. 5,626,961, for example, but only a discontinuity in the periphery of the filament. Where "NONE" is recorded for Comparison Y, there was not even any such discontinuity, i.e., the drawn filaments were of smooth oval peripheral cross-section.

TABLE V

|  | Processing | | RTPT Pill Rating (30 min) | |
|---|---|---|---|---|
|  | Fiber Spinning | Mill/Yarn Processing | Without Moisture | Added Moisture |
| Examples I and II | Good | Good | >3.5 | >3.5 |
| Examples III and IV | Good | Good | >3.0 | >2.5 |
| Comparison X | Good | Poor | >3.5 | >3 |
| Comparison Y | Poor | Good | >3.5 | >2.5 |
| Comparison Z | Good | Good | 1–3 | 1–2 |
| (Type 702W) | Good | Good | 1 | 1 |

TABLE VI

Properties of Filaments Used

| FILA-MENTS | TENA-CITY gpd (g/dtex) | $E_B$ % | MODU-LUS gpd (g/dtex) | DHS % | CPI (CPcm) | GROOVE RATIO | AS-PECT RATIO |
|---|---|---|---|---|---|---|---|
| X - as-spun | 1.1 (1.0) | 220 | 16 (14) | | | | |
| X - drawn | 2.0 (1.8) | 21 | 34 (31) | 1.5 | | 0.84:1 | 1.4:1 |
| Y - as-spun | 1.0 (0.9) | 271 | 18 (16) | | | | |
| Y - drawn | 2.2 (2.0) | 20 | 40 (36) | 1 | 13 (5) | None | 1.5:1 |
| Z - as spun | 1.0 (0.9) | 212 | 11 (10) | | | | |
| Z - drawn | 1.8 (1.6) | 22 | 40 (36) | | 12 (5) | 0.84:1 | 1.43:1 |
| 702W - as spun | 1.3 (1.2) | 239 | 18 (16) | | | | |
| 702W - drawn | 3.4 (3.1) | 37 | 34 (31) | 4.1 | 12 (5) | 0.68:1 | 1.7:1 |

What is claimed is:

1. A basic-dyeable ethylene terephthalate copolyester polymer that contains 0.5 to 3 mol % of a sodium sulfonate salt of a glycollate of isophthalic acid, and that has been polymerized in the presence of a trifunctional or tetrafunctional silicate ortho ester in amount (TES %) at least 0.05% by weight, said copolyester being of LRV relative viscosity about 8 to about 12 and about 1 to 3 delta RV, as defined, wherein said amount (TES %) corresponds to the Non-Acid Relative Viscosity (NRV) of the polymer as defined by the polygon ABCDEFGA in FIG. 1 of the accompanying Drawings.

2. A polymer as claimed in claim 1, wherein said amount (TES %) corresponds to the (NRV) as defined by the triangle JKLJ in FIG. 1 of the accompanying Drawings.

3. The polymer of claim 1 in the form of staple fiber of denier per filament about 0.5 to about 5 and cut length about 20 mm to about 10 cm, said fiber providing fabrics of pill rating as defined herein after 30 minutes of 2.5 to 5.

4. The polymer of claim 3, wherein said fiber is of multi-grooved scalloped-oval peripheral cross-section of aspect ratio about 1.3:1 to about 3:1 and groove ratio as defined about 0.50:1 to about 0.95:1.

5. A basic-dyeable ethylene terephthalate copolyester polymer that is in the form of fiber and that contains 0.5 to 3 mol % of a sodium sulfonate salt of a glycollate of isophthalic acid, and that has been polymerized in the presence of a trifunctional or tetrafunctional silicate ortho ester in amount (TES %) at least 0.05% by weight, said fiber being of LRV relative viscosity about 8 to about 12, as defined, and having a (TES wt %) amount that corresponds to the Non-Acid Relative Viscosity (NRV) of the fiber as defined by the pentagon MNOPQM in FIG. 2 of the accompanying Drawings.

6. A polymer as claimed in claim 5, wherein said (TES wt %) amount corresponds to the (NRV) as defined by the quadrilateral RSTUR in FIG. 2 of the accompanying Drawings.

7. The polymer of claim 5 in the form of staple fiber of denier per filament about 0.5 to about 5 and cut length about 20 mm to about 10 cm, said fiber providing fabrics of pill rating as defined herein after 30 minutes of 2.5 to 5.

8. The polymer of claim 7, wherein said fiber is of multi-grooved scalloped-oval peripheral cross-section of aspect ratio about 1.3:1 to about 3:1 and groove ratio as defined about 0.50:1 to about 0.95:1.

* * * * *